March 23, 1971
S. R. FREELAND
3,572,230
RANGE DETERMINING DEVICE WITH MANUALLY
OPERABLE PENDULOUS MEMBER CONTROL
Filed Aug. 28, 1968
2 Sheets-Sheet 2
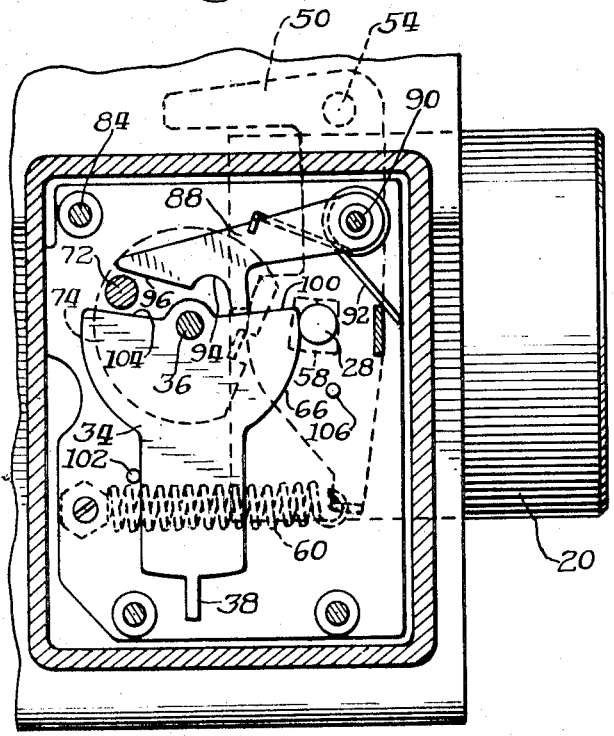
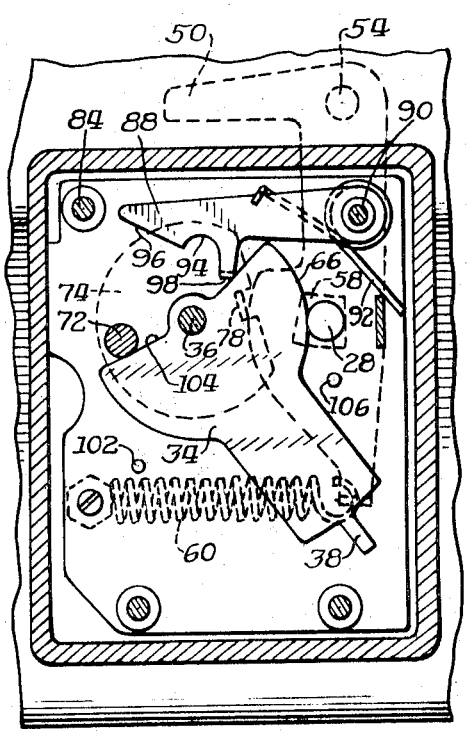
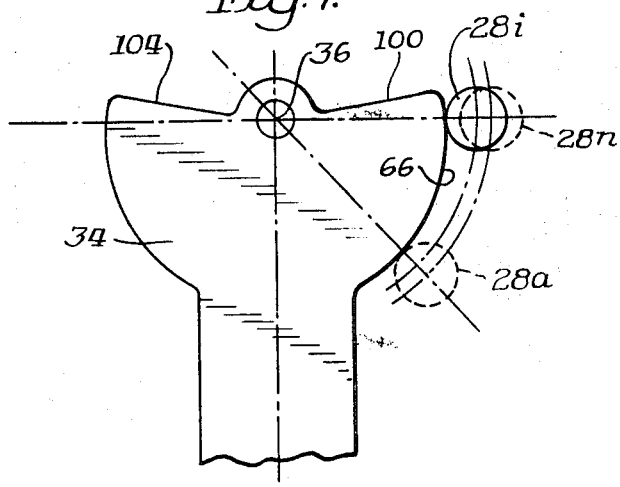
INVENTOR:
Stanley R. Freeland.
BY
ATTYS United States Patent Office 3,572,230
Patented Mar. 23, 1971

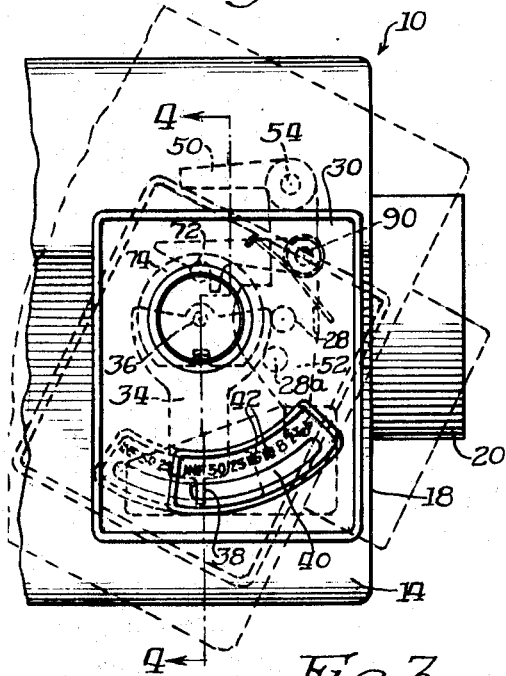
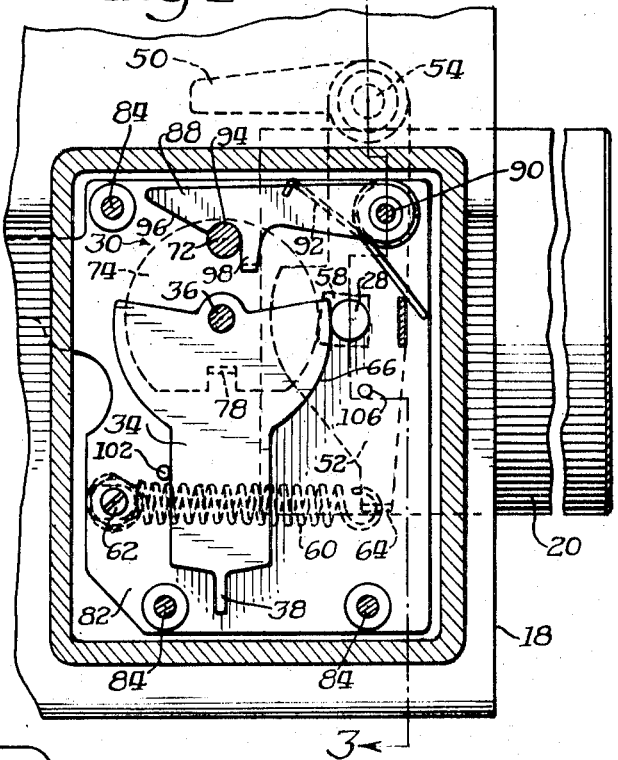
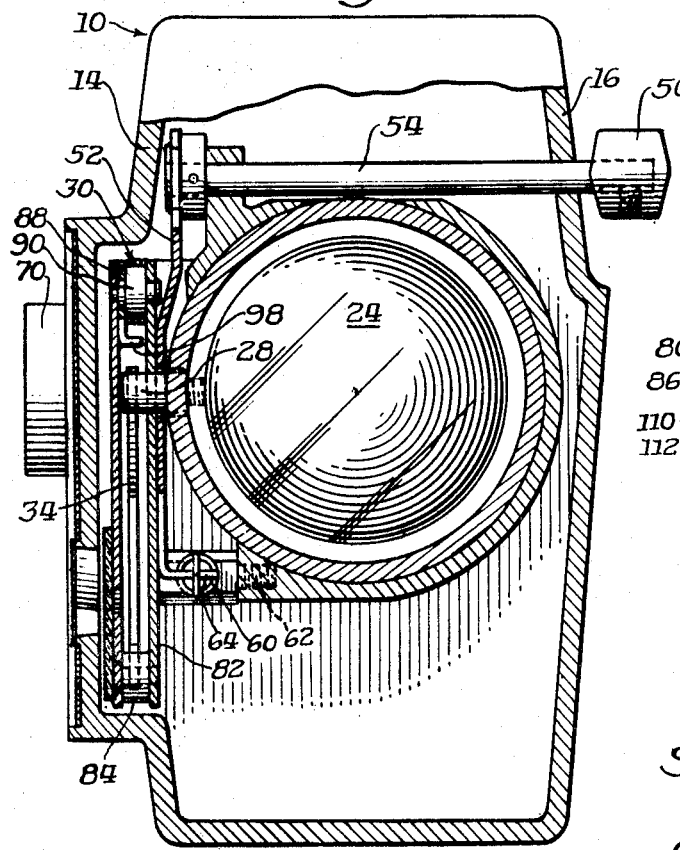
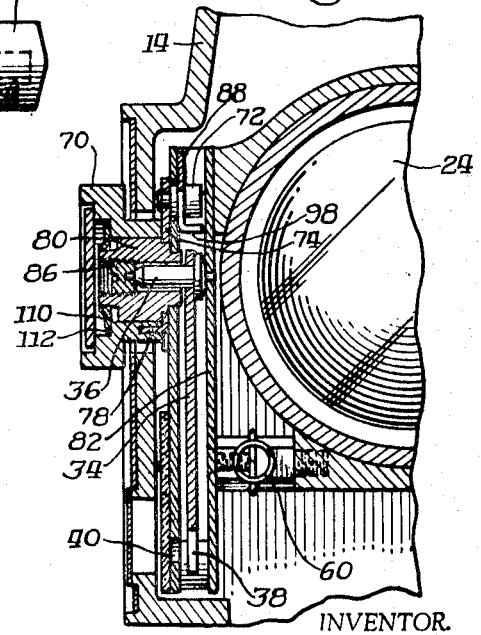
INVENTOR.
Stanley R. Freeland

3,572,230
RANGE DETERMINING DEVICE WITH MANUALLY OPERABLE PENDULOUS MEMBER CONTROL
Stanley R. Freeland, Glenview, Ill., assignor to Bell & Howell Company, Chicago, Ill.
Filed Aug. 28, 1968, Ser. No. 755,882
Int. Cl. G03b 3/02
U.S. Cl. 95—44
9 Claims

ABSTRACT OF THE DISCLOSURE

An improved objective focusing device for an optical instrument having a focusable objective and a freely swingable pendulous member which may assume an angular aspect corresponding to a focus distance. The objective is focused in response to a cam on the pendulous member. A manual control is connected to a driver which is selectively movable to engage and positively position the pendulous member. A holder prevents undue movement of the pendulous member and restrains the driver out of engagement for non-manual adjustment of the member.

---

The present invention relates to an improvement in a focusing mechanism for a camera having an objective lens which is adjustable according to distances which are determined by a pendulous rangefinder in accordance with the principles of triangulation. Particularly, the invention relates to a manually operable device for positively positioning a normally free-swinging pendulous member to adjust a focusing cell of a lens.

Pendulous rangefinders for determining the distance between a camera and a subject are known. One such pendulous rangefinder for a triangulation focusing mechanism is described in co-pending application Ser. No. 735,231, filed on June 7, 1968, titled Camera Focusing Mechanism Using Triangulation Principle, and assigned to the assignee of the present application. According to that application, a pendulous member swings relative to the optical axis of an objective lens to an aspect corresponding to distance as determined by the inclination of the axis, when the camera is aimed at the base of a subject. The objective lens is then moved by direct manually-applied torque to a predetermined distance from the pendulous member to cause the objective lens to be focused on the subject.

The mechanism described is quite satisfactory for use in a semi-automatic mode. However, manual focusing of the objective lens by scale, based on accurate distance measurements or estimates, is often desirable.

The present mechanism includes a pendulous member arranged for swinging movement relative to the housing of a camera having an objective lens assembly arranged for focusing adjustment relative to a film plane in the housing. A manually operable device having an element external of the housing permits a user to selectively condition the pendulous member for free-swinging movement and to positively adjust the member to a selected position for manual focus of the objective lens.

To improve upon the device disclosed in the above-referenced co-pending application, a manual control device is provided having a portion exterior of the instrument housing and being connected interiorly to a driver which may engage a pendulous member arranged for free-swinging movement in a semi-automatic operational mode. A yieldably conditioned holder member restrains the pendulous member against free rotation in the direction in which the driver moves the pendulous member. When the pendulous member is in a non-manual operational mode, the holder restrains the driver from inadvertent movement into engagement with the pendulous member.

An object of the present invention is to provide a novel manual control mechanism for a distance determining device for a camera.

Another object is to provide for a distance determining device a novel manual control mechanism for positioning positively a freely swingable member for manual setting of focus distance in response to the position of the member.

Further and other objects will be apparent from the description of the accompanying drawings in which like numerals refer to like parts.

In the drawings:

FIG. 1 is an elevational view of a portion of a camera incorporating the mechanism of the present invention, with parts eliminated for clarity;

FIG. 2 is an enlarged view of the mechanism of the invention as seen in FIG. 1, with parts broken away and parts removed;

FIG. 3 is a sectional view of the mechanism taken along line 2—2 of FIG. 2;

FIG. 4 is a sectional view of the mechanism taken along line 4—4 of FIG. 1;

FIGS. 5 and 6 are views similar to FIG. 2 with parts displaced, respectively, immediately before manual operation, and after manual adjustment; and FIG. 7 is an enlarged view showing relative positions of a pendulous member and a lens positioning pin.

Referring to the figures, there is shown a portion of an optical instrument, such as a camera 10 having a housing formed with wall portions including a first side wall 14, a second side wall 16, and a front wall 18. Extending from front wall 18 is a lens barrel 20 supporting an objective lens including a focusing cell, shown as element 24. A positioning pin 28 extends radially from focusing cell 24 to co-operate with a range determining device 30, which device can reciprocatively adjust the cell along an optical axis defined by the axis of the objective. By the adjustment, the focal plane of the objective can be made coincident with a film plane of the camera so as to focus the image of a remote subject on that plane.

Range determining device 30 includes a pendulous member 34 supported for free-swinging movement about a pivot, shown as axle 36. The pendulous member, unless restrained, tends to seek continuously a gravity oriented vertical position regardless of orientation of the optical axis. Such an orientation of the optical axis occurs when a subject is viewed with its base aligned with a reference mark in the not shown viewing system of the camera. The lower end of pendulous member 34 is shaped as a pointer 38 which moves relative to window 40 in the camera housing. Several reference marks 42 forms a distance scale adjacent the window to provide a visual indication of the distance at which the objective is focused. As will be understood hereinafter, the scale also provides a reference for manual adjustment of the focus of the objective.

For automatic adjustment of focus of the objective, the subject is viewed through the camera's viewfinder system (not shown) and the base of the subject is aligned on a reference mark in the viewfinder. Assuming the subject to be located at a distance from the camera within the objective's focusing range, the camera and the optical axis would be tilted downwardly. Pendulous member 34 may then be released from an earlier adjusted position by the depression of lever 50. Lever 50, external of the camera housing, is operatively connected to actuator member 52 by link member 52 which defines a pivot axis about which the lever is moved.

Actuator member 52 includes a receiver, shown as cutout 58, into which focusing cell positioning pin 28 extends. When actuator member 52 is in a rest position, a resilient member, shown as spring 60, urges pin 28 toward pendulous member 34. This spring, connected by fastener 62 to the housing and by lug 64 to actuator member 52, continuously urges actuator member 52 about the axis through link member 54 to engage and move pin 28 as far as possible. Thus, focusing cell 24 is moved to a desired position.

As seen in FIGS. 2 and 7, positioning pin 28 is movable toward pendulous member pivot 36 to engage a cam surface 66 of pendulous member 34. Cam surface 66 is empirically computed so as to cause movement of positioning pin 28 from a first position (28i solid line in FIG. 7) wherein the focus of the objective is at infinity, and a second position (28n dashed line) wherein the objective is adjusted for near focus. The lower dashed line position 28a is understood to be the relative position of engagement when pendulous member 34 is adjusted to near its near focus position.

Positioning pin 28 is to be understood not to change its position relative to pivot point 36, except for reciprocative movement between positions 28i and 28n. The amount of relative rotation between the housing and pendulous member 34 (as suggested in dashed line position in FIG. 1) causes alignment of a particular portion of cam surface 66 for engagement by positioning pin 28. Thus, depression of focus lever 50 is understood to remove pin 28 from engagement with pendulous member 34 and to hold that pin removed clear of the highest use of cam surface 66.

While in a free-swinging condition, pendulous member 34 is oriented by gravity until focus lever 50 is released. Upon release of lever 50, spring 60 urges pin 28 into engagement with cam surface 66 to adjust the position of lens cell 24 according to the orientation of the pendulous member. Spring 60 biases pin 28 against the cam surface radially of the pivot 36 and with sufficient force to prevent an inadvertent change of the adjusted position of pendulous member 34.

Under certain camera operating conditions, manual focusing of the objective is desired, as when the camera is mounted on a tripod. Assuming the distance to the subject has been earlier determined, it is necessary then to focus the objective for that distance. To enable manual focusing of the objective, knob 70 (FIGS. 3 and 4) is located externally of the housing for rotation by the operator. Assuming distance determining device 30 to be in the automatic condition as shown in FIGS. 1 and 2, pendulous member 34 is freely swingable about pivot 36.

To condition the device from the automatic focusing mode to the manual focusing mode, the operator rotates knob 70 counterclockwise of the position in which it would be oriented if shown in FIG. 2. From FIG. 4, knob 70 is seen to be connected to a stud or driver member 72 through coupler plate 74 on which driver member 72 is supported. Tab 78 is bent from coupler plate 74 and inserted into a portion of knob 70 interior of the housing to connect the plate to that knob. Coupler plate 74 is mounted for rotation about an axis defined by bearing 80, which bearing surrounds axle 36 and also supports knob 70 on mechanism plate 82 which is in turn fixed to the housing by fasteners 84. In this preferred embodiment, an adjustable sleeve bearing 86 is threaded internally of knob bearing 80 for end-play adjustment of axle 36. The axle is slightly smaller than the internal opening of knob bearing 80 for positive clearance.

Rotation of knob 70 from an automatic condition (FIG. 2) to a manual condition (FIG. 6) requires rotation of driver member 72 clear of holder member 88. This holder member pivots about axle 90, (FIG. 3) which supports that member on mechanism plate 82. An arm of spring member 92 which is coiled about axle 90, engages holder member 88 to bias the same counterclockwise as oriented in FIG. 2. Holder member 88 is configured with a pocket 94, an inclined surface 96, and an abutting member or shoe 98.

When conditioned for automatic focusing operation, holder member 88 is held near its most clockwise position by location of driver member 72 in pocket 94. Rotation of driver stud 72 by knob 70 causes the stud to lift holder member 88 and move out of pocket 94 onto inclined surface 96. As driver stud 72 is rotated further counterclockwise, holder member 88 follows by the urging of spring 92, which maintains inclined surface 96 in engagement with the driver stud until shoe 98 engages upper edge 100 of pendulous member 34, as in FIG. 5. Engagement of edge 100 by shoe 98 rotates pendulous member 34 against stop 102, which is fixed to mechanism plate 82.

Further rotation of knob 70 rotates driver stud 72 clear of inclined surface 96 and into engagement with edge 104 of pendulous member 34. Still further rotation of driver stud 72 then pushes member 34 about pivot axle 36 thus moving the member from stop 102 toward secondary stop 106. While member 34 is pushed by driver stud 72, edge 100 forces shoe 98 of holder 88 to rotate the holder against the urging of spring 92. Hence, pendulous member 34 is restrained against free movement while being manually adjusted by the pushing of driver 72 in one direction and the urging of spring 92 by holder 88 in the opposite direction. Due to the urging of spring 92, relative rotation can occur between knob bearing 80 and knob 70. To prevent this spring from altering the manually adjusted position of pendulous member 34, yieldable ring retainer 110 is pushed onto the outer periphery of knob bearing 80, and against internal shoulder 112 of knob 70. Retainer 110 thus generates a friction coupling between the parts sufficient to overcome changes induced by spring 92.

Member 34 rotates under control of knob 70, and as rotation occurs, pointer 38 moves relative to scale 42 until the scale indicates that the objective is in focus for the desired distance. While member 34 is being rotated, spring 60 maintains positioning pin 28 in frictional engagement with cam surface 66. Hence, the focusing cell 24 of the objective is adjusted to focus the image of a subject at the desired distance on the film plane of the camera by accurate following of the cam surface by cell positioning pin 28.

Rotation of knob 70 in a clockwise direction from a manually focused condition causes driver stud 72 to move clockwise while permitting spring 92 to return pendulous member 34 against stop 102 by the pressure of shoe 98 on edge 100 of member 34. Continued rotation of knob 70 brings driver stud 72 into engagement with inclined surface 96 of holder member 88 to raise that member until the stud seats in pocket 94 thereof. From the initiation of the lifting of holder member 88, shoe 98 is raised from edge 100 of the pendulous member 34. Since member 34 is held by positioning pin 28 against movement away from stop 102 and is not engaged by either driver 72 or abutting portion 98, that member will remain in this position until again adjusted by either manual or automatic adjustment.

It is to be understood that the embodiment shown is illustrative of the principal operation of a focusing mechanism for cameras which employs a pendulous rangefinder and that certain changes, alterations, modifications or substitutions can be made in the structure of the device without departing from the spirit and scope thereof.

The embodiments of the invention in which an exclusive property or privilege is claimed are defined as follows:

1. A range determining device for use with an optical instrument having a housing and an objective having a focusable lens cell, the device comprising:
   a pendulous member supported on said housing for selective conditioning between a free-swinging first condition and a retained second condition;
   a cam surface on said pendulous member;

lens cell positioning means engageable frictionally with said cam surface;

means for urging continuously said positioning means toward engagement with said cam surface; and manually operable means external of said housing and operatively coupled with said pendulous member for adjusting said pendulous member while said positioning means engages said cam surface wherein said pendulous member is retained in an adjusted position.

2. A device as in claim 1 including coupling means to couple selectively said manually operable means to said pendulous member for permitting positive positioning of said member by said manually operable means when coupled, and for permitting said member to be adjustable under the influence of gravity when uncoupled.

3. A device as in claim 2 wherein said coupling means comprises a disc member supporting a driver for movement between a first position away from said pendulous member and a second position in which said pendulous member is driven to an adjusted position.

4. A device as in claim 3 wherein said driver is engageable with said pendulous member to drive said member unidirectionally from a first posiiton to a second position.

5. A device as in claim 3 including a holding means for retaining said driver in a first position and for releasing said driver for movement to a second position.

6. A device as in claim 5 including biasing means for urging said holding means in a first direction for retaining said driver in said first position and for permitting movement of said holding means by said driver as said driver moves to said second position.

7. A device as in claim 5 wherein said holding means includes an abutting portion for pushing said pendulous member unidirectionally when said driver is moved from said first position toward a second position for pushing said member oppositely.

8. A device as in claim 7 wherein said driver and said abutting portion of said holding means engage said pendulous member for control of movement of said pendulous member during manual adjustment, and are clear of said pendulous member during gravity influenced adjustment of said pendulous member.

9. A device as in claim 8 including a lever adapted for movement between a first position and a second position, and actuator means operatively connected with said lever and said positioning means wherein said positioning means is removed from engagement with said pendulous member in one condition of said lever and is in engagement with said member in the other condition of said lever.

References Cited

UNITED STATES PATENTS 1,325,154  12/1919  Hopkins _____ 355—58

JOHN M. HORAN, Primary Examiner

U.S. Cl. X.R.

355—58